UNITED STATES PATENT OFFICE.

EDWARD D. KENDALL, OF ELIZABETH, NEW JERSEY, ASSIGNOR OF ONE-HALF TO LOUIS T. HAGGIN, OF CLOSTER, NEW JERSEY, AND MARGARET V. HAGGIN, AND ALLAN McCULLOH, OF NEW YORK, N. Y., AND H. ESK MOLLER, OF MONTCLAIR, NEW JERSEY, EXECUTORS OF JAMES B. HAGGIN, DECEASED.

SULFONATING COAL-TAR DYES.

1,217,462.  Specification of Letters Patent.  Patented Feb. 27, 1917.

No Drawing.  Application filed July 13, 1916.  Serial No. 109,040.

*To all whom it may concern:*

Be it known that I, EDWARD D. KENDALL, a citizen of the United States, residing at Elizabeth, in the county of Union and State of New Jersey, have invented a new and useful Process for Sulfonating Coal-Tar Dyes, of which the following is a specification.

The usual methods of preparing sulfo-acid dyes (dyes containing the $SO_3H$ group) require the use of expensive fuming sulfuric acid, or the still more costly sulfuric anhydrid and the manufactural operations necessitate the use of specially adapted plants and require skilled and supervised labor and the objects of my invention are to avoid the use of expensive agents and provide a simple process by which the dyer himself may easily and cheaply prepare his sulfo-acid dyes from the suitable basic colorific bodies or compounds thereof.

In carrying out my invention I first prepare or purchase acid alkali-metal sulfate, preferably, for cheapness, hydrogen sodium sulfate, commonly known as bisulfate of soda ($NaHSO_4$) and convert this into sodium disulfate ($Na_2S_2O_7$) by application of heat (using—say an ordinary porcelain evaporating dish on a sand-bath) until the temperature of fusion is reached and for a sufficient time to vaporize the water so formed and freed: when the fluid sodium disulfate thus produced becomes quiescent, after the passing off of the aqueous vapor, I remove temporarily the source of heat and when the temperature has fallen somewhat I add to the disulfate monohydrated sulfuric acid ($H_2SO_4$) in the proportion of one chemical equivalent and then renew the application of heat while stirring the contents of the porcelain vessel with a heavy glass rod; the persulfated body thus produced may be represented by the formula $Na_2S_2O_7.H_2SO_4$; it solidifies when cooling and may be kept for an indefinite time in air-tight iron receptacles, even cans of thin sheet iron, but the dyer, at any time, may easily and quickly prepare this acid-agent when required for use and proceed as follows to obtain the sulfo-acid dye desired: after preparing the persulfated sodium body and continuing the moderate heat required to keep this acid-agent fluid, he should add gradually and stir into—say seven ounces of it one ounce of the dye-stuff to be sulfonated (which may be, for example, one of the triphenylmethane group of coal-tar dyes say commercial rosanilin hydrochlorid) after having pulverized or granulated the same and thoroughly dried it by subjecting it, in the open air, for a sufficient time to a temperature of about 110° C.; the stirring should be continued until the said dye-stuff shall have been thoroughly incorporated with the sulfonating acid-agent and for ten or fifteen minutes longer; then allowing the mass to cool, preferably with continual stirring, which yields the mixture in granular or fragmental form, the dyer may at once use it for dyeing wool or silk by dissolving it in hot water, the acid-condition of the bath so formed being necessary in dyeing wool or silk and the presence of the sodium-salt in the bath being not only no detriment thereto but precisely what is required to retard the too rapid absorption of the dye by the avidity of the wool or silk for the same, whereby the first portions of the wool or silk put into the bath may be too quickly or excessively dyed at the expense of the portions which follow.

Should the dyer wish to keep on hand a supply of the said sulfonating acid-agent it should, of course, be kept from contact with the air and for this purpose glass-stoppered bottles or jars may be conveniently used.

Should it be desired to separate the sulfonated dye-stuff from excess of sulfuric acid in the sulfonating mixture, as would be advisable in preparing the dye for market, this may be done, by the dye-manufacturer, by dissolving in water the entire product of the herein described process of sulfonation and stirring into the solution an equivalent amount of lime or barium carbonate; allowing the heavy sulfate so formed to settle, filtering the liquid and evaporating the filtrate to dryness.

I claim:

1. The herein described process of sulfonating coal-tar dyes, which consists in converting hydrogen sodium sulfate into sodium disulfate and then persulfating this with one chemical equivalent of monohydrated sulfuric acid and then adding to this persulfated body, when in a state of fusion, the pulverized and dehydrated coal-tar dye to be sulfonated, with thorough admixture until sulfonation of the dye is effected, substantially as herein described.

2. The herein described process of sulfonating coal-tar dyes, which consists in persulfating an alkali-metal disulfate by incorporating therewith one chemical equivalent of monohydrated sulfuric acid and adding to this persulfated body, when in a state of fusion, the pulverized and dehydrated coal-tar dye to be sulfonated, substantially as herein described.

3. The herein described process of sulfonating coal-tar dyes, which consists in persulfating an alkali-metal disulfate by incorporating therewith one chemical equivalent of monohydrated sulfuric acid and adding to this persulfated body, when in a state of fusion, the pulverized and dehydrated coal-tar dye to be sulfonated, afterward dissolving the entire mass in water and removing excess of sulfuric acid with an equivalent amount of calcium hydroxid; then filtering the solution and evaporating the filtrate to dryness, substantially as herein described.

EDWARD D. KENDALL.